INVENTORS
Lucien V. Auletta
Blair E. Cornish
BY Eugene P. Damm, Jr.
Mark A. Faigenbaum
Andrew M. Simon
By Littlepage, Quaintance, Wray & Aisenberg ATTORNEYS INVENTORS
Lucien V. Auletta
Blair E. Cornish
BY Eugene P. Damn, Jr.
Mark A. Faigenbaum
Andrew M. Simon
By Littlepage, Quaintance, Wray & Aisenberg
ATTORNEYS United States Patent Office 3,660,263

Patented May 2, 1972

3,660,263

HOSTILE ENVIRONMENT PROTECTION OF CRITICAL METALLIC SURFACES BY ELECTROPHORETICALLY DEPOSITED COATINGS

Lucien V. Auletta, Wappingers Falls, Blair E. Cornish, Stone Ridge, Eugene P. Damm, Jr., and Mark A. Faigenaum, Poughkeepsie, and Andrew M. Simon Wappingers Falls, N.Y., assignors to International Business Machines Corporation, Poughkeepsie, N.Y.

Filed Oct. 28, 1969, Ser. No. 871,825
Int. Cl. B01k *5/02;* C23b *13/00*
U.S. Cl. 204—181 5 Claims

ABSTRACT OF THE DISCLOSURE

Application techniques and material design properties and formulations are described for electrophoretically deposited hostile environment protective coatings for exposed critical metallic surfaces. Formulation properties and examples of electrophoretically depositable aqueous polymer latices and/or co-blends of aqueous polymer latices are disclosed. Said latices and/or latice blends having such desirable coating properties as low gas transmission, adhesion, non-flammability crack resistance, flexibility, selected and useful dye compatibility, requisite thickness, electrical requirements and chemical resistance, are illustrated for the generic latice blends, polyvinylidene chloride (saran) and epoxy ester.

INTRODUCTION

The use of exposed critical metallic surfaces (herein intended to mean surfaces where corrosion would lead to functional impairment) to hostile environments, such as, for example, in the computer control of chemical processes where noxious and/or corrosive concentrations of gases such as $H_2S$, $SO_2$, $Cl_2$ and $SO_3$ are typically encountered in selective applications, is known.

Dip and spray coating application techniques and materials used in an attempt to protect such critical metallic surfaces possess economic and ease of application advantages, but often fail due to material weakness, lack of complete coating (pin holes and/or gross uncoated areas) which lead to critical traumas causing the gross degradation of the electrical function through chemical corrosion.

Properly designed electrophoretic deposited coating techniques possess the inherent advantages of potential freedom from pin holes, superior recess coating (vis-à-vis dip or spray coating) application ease and tailoring capabilities (vide-infra).

Herein is described an electrophoretic deposition technique and hostile environment protective material which are achieved at low cost, and with ease of application while providing dye compatibility, non-flammability, etc. so as to provide hostile environment protection of the previously mentioned critically exposed metallic surfaces (for example, metallic interconnection and/or terminations, connectors and leads).

Design requirements for a hostile environment protective coating technique typically include low gas transmission, high adhesion, non-flammability, dielectric properties (requisite low electrical conductivity), lack of chemical reactivity with potential corrosives in functional durometer flexibility, handling ease and chip resistance).

Electrophoretic deposition techniques are well known in the literature and typically involve the low voltage anodic attraction and deposition to a coherent continuous and functional film thickness on an anodically powered work piece suspended in an aqueous polymer latice bath or blended bath (colloidal suspension of polymer particles).

The unobvious blending of aqueous polymer latices (anionic colloidal suspension of polymer particles), tolerable deposition and final processing thereof to achieve the aforementioned desirable hostile environment and non-flammability protective properties are illustrated by the example below.

THE INVENTION

In order to achieve the aforementioned and described requirements for a hostile environment protective coating, development was achieved in the unobvious approach described below.

It is a recognized outstanding and remarkable property of the latices of the polymers and selectively copolymerized polymers of polyvinylidene chloride to provide coatings which exhibit high gas barrier properties, and at times, crack resistance and adhesion; and, distinct and remarkable adhesion and flexibility requirements are exhibited by the epoxy ester latices.

Yet the latices of the type mentioned above, and various other available types of latices, when electrodeposited, proved unsatisfactory for adequately protecting metal connectors for computers and like memory devices. Typically, the connectors for such memory devices are a trademark item called "Sil-fos" which is an alloy of 15% silver, 4% phosphorus and the remainder a copper.

Unexpectedly, it was found that a blend of commercially available latices of (a) polyvinylidene chloride, polyvinylidene fluoride or copolymers of polyvinylidene chloride with (b) an epoxy ester formed a stable latex coating bath which could be used for the electrophoretic deposition of a coating upon anodically corrodable materials such as copper and copper based alloys and the like used in electrical connectors and that said coatings have the unexpected properties of exceptional corrosion resistance and non-flammability. In addition, such coatings have an unusual combination of physical attributes such as freedom from sagging during drying, freedom from pin holes, high adhesion, desired flexibility and hardness, resistance to ordinary solvents encountered, desired thickness, etc. Also, where desired, compatible colored pigments and dyes could be included for coding or other purposes.

It has been found that a variety of suitable latices of both types are available commercially. Saran (polyvinylidene chloride) terpolymer latices are readily available from the Dewey and Almy division of W. R. Grace and Company of Cambridge, Mass. under their "Daran" trademark, such as Daran X–225. Other suitable saran latices are available from the Dow Chemical Company under their "CX" designation typically CX–7150 and CX–2139. Typically, the saran copolymer resins contain at least 15–20% of a vinylidene chloride and the remainder the copolymers of vinylidene chloride with one, or more, of vinyl chloride, acrylonitrile, and/or butadiene and/or styrene. They are readily available commercially in percentages of vinylidene chloride between 30–70% and such resins are fully satisfactory. The latices typically have particle sizes varying from .2 to 2 microns and these particle sizes are also quite suitable for the purposes of this invention. The identity of the aqueous latices is most easily determined by an infrared spectrogram of a thin coating of the latex upon glass or other suitable substrate, by voltammograms and the like, and their equivalency with other substitute aqueous latices can be determined by measurement of pH, percent solids, particle size, density and empirical desposition characteristics. The coating to determine the infrared spectrogram can be obtained by merely brushing on the substrate a thin film of the latex and permitting it to dry. Hereinafter such infrared spectrograms are designated as the "infrared spectrogram of the latex."

The epoxy ester resin latices are likewise readily available from a number of commercial sources in like particle sizes. For example, one suitable latex is available from Ciba Company, Inc., Fair Lawn, N.J., under their trademark "Araldite DP–624." Other suitable epoxy ester resin latices are available from Shell Chemical Company, Downey, Calif., under their trade designation Resin DX–15 or Resin DX–16 or from Union Carbide Corporation, 270 Park Ave., New York, under their trade designation of Epoxy Ester EC–3019.

Typically, latices are available in pH's of 8–10 and have been found wholly compatible when blended together. If the pH's are widely different either one or both pH's may be adjusted so as to make them compatible, say to a pH varying from about neutral to about ten, by use of well known and easily applied ion-exchange techniques or other suitable techniques.

In the practice of this invention, it has been found that a wide range of blends of the commercially available latices mentioned above are suitable for the practice of the invention. Most advantageous however, the blend should contain at least 10% of the saran copolymer and preferably 40–85% of the saran copolymer, having correspondingly 60–15% of the epoxy ester.

Latices of the type mentioned suitable for application in the process hereof are available in solids concentration of 50–60%. Yet they will readily electrophoretically deposit out of the blended bath in concentrations below 15%, even satisfactorily at concentrations as low as 10% of the polyvinylidene polymer. Thus no problem is encountered in providing blends of latices with sufficient solids content to assure satisfactory electrodeposition of the protective coating. Conventional recycling techniques can also be used.

Conventional voltages and current densities used for electrophoretic deposition may be used in the process of this invention, typically 10–60 volts DC giving 1–10 mil thick coating in from 5–60 seconds depending on bath conductivity and electro geometry. It is an advantage of this invention that a very simple power supply can be used in the process hereof such as a transistorized supply system rated at 0–36 volts and 0–50 amps. Such a power supply system is available from Electronic Measurement Company, Inc., Eatontown, N.J. With such a device very satisfactory films can be deposited, the voltage used being determined by the spacing between the anode and the cathode. Of course, apparatus generating higher voltages could be used but normally voltages in excess of 100 volts are not necessary. Using the process of this invention films of up to 50 mils are readily obtainable although films of much lesser thickness are completely suitable for the purposes of the invention. Typically, films of .1 to 1.75 mils in thickness are satisfactory. The flexibility of the film may not be completely satisfactory for certain uses when they exceed a thickness of 10–11 mils.

The remarkable efficiency of the process of this invention is highlighted by the fact that bundles of interterminated arrays have been satisfactorily coated by imposing a voltage of 20 volts in the above described apparatus for a period of 60 seconds upon a blend of latices containing 85% of a saran copolymer containing about 60% solids and 15% of an epoxy ester containing about 50% solids together with sufficient amounts of a carbon black suspension (about 1.5%) to color the coating.

The foregoing and other objectives, features and advantages of the invention will be apparent from the following more particular description of a preferred embodiment of the invention as illustrated in the accompanying drawings in which.

Figure 1:
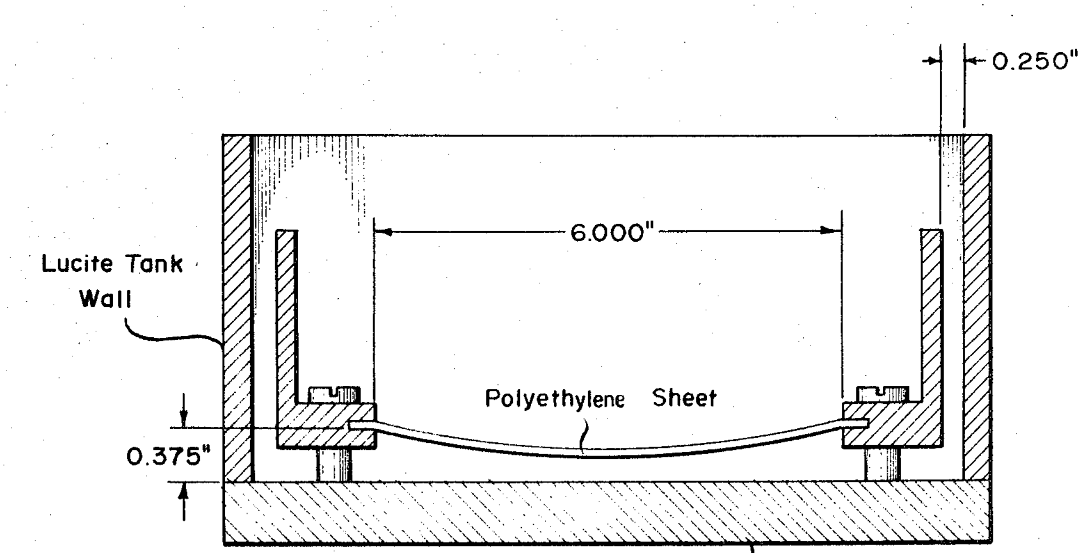
FIG. 1 is a cross sectional view of a suitable electrophoretic coating vessel (without showing power supply)
Figure 2:
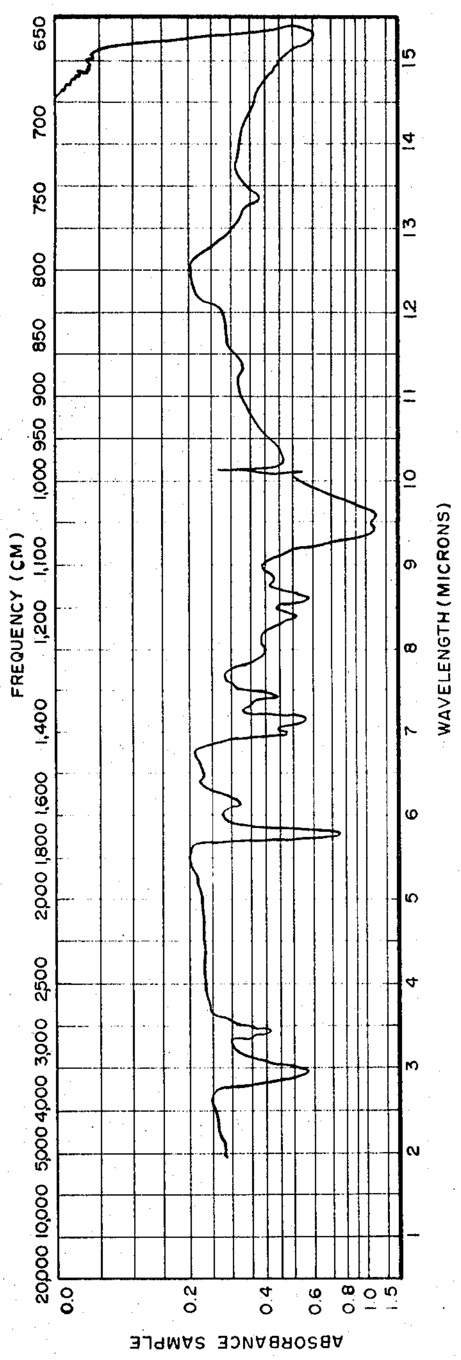
FIG. 2 is the infrared spectrogram of a suitable saran copolymer latex.
Figure 3:
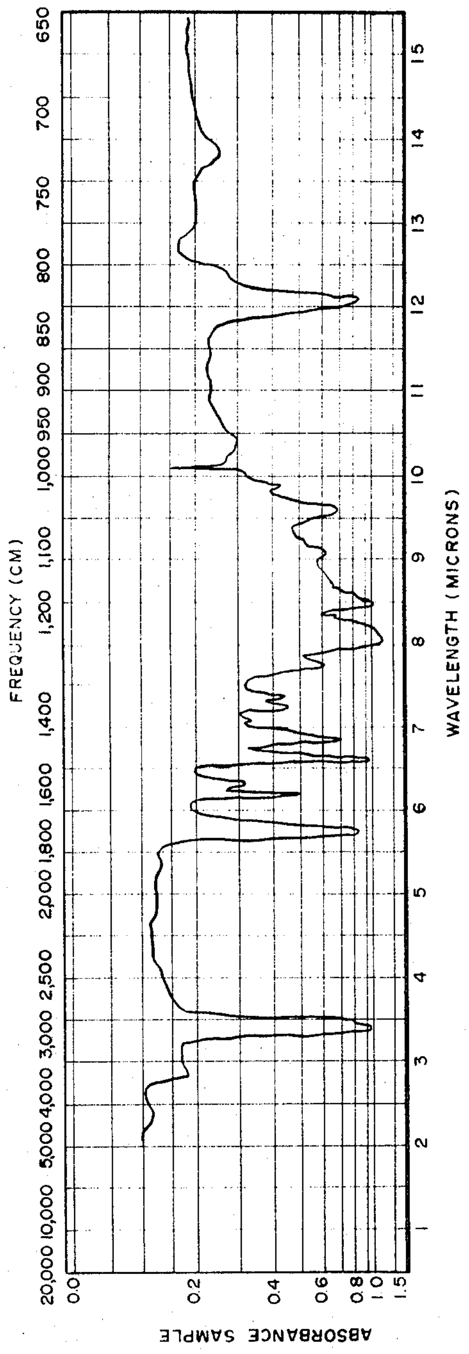
FIG. 3 is an infrared spectrum of a suitable epoxy ester latex.

In a particular embodiment of the invention a suitable electrophoretic plating bath was provided in the coating vessel of FIG. 1 by introducing thereinto 85% of Daran X–225 aqueous polymer latex typified by the Infrared Spectrum of FIG. 2 and 15% of Araldite DP–624 typified by the Infrared Spectrum of FIG. 3. These latices respectively contained about 61% and 50% solids by weight. About 1.5% of a 30% solids content carbon black available under the trade name Aqueblack K from Columbia Carbon Company of 380 Madison Ave., New York, was added to the coating bath to impart color. In the apparatus shown the coating bath would consist of about 1000 grams of the saran copolymer/epoxy ester latices and about 15 grams of the carbon black suspension.

The diaphragm shown in the bottom of the vessel is a porous polyethylene sheet conventionally used to break-up and/or intercept hydrogen bubbles formed at the cathode and yet permit the passage of the suspended resins.

After washing the array in the conventional manner as in a flourinated hydrocarbon bath and then in a mild (approximately 1%) sulfuric acid bath and thereafter rinsing the array, the posts in the array are all connected anodically and the array is then immersed in the coating bath. The array is so positioned that the distance between the anode and the steel cathode positioned in the bottom of coating vessel is 0.5 inch. Upon impressing a voltage of 6 volts on the short side for about 40±2 seconds and 36 volts on the long side for about 30±5 seconds, a satisfactory coating of about 3–7 mils is obtained. Thereafter the array is removed, allowed to drain and washed with water (usually about 45 seconds) until excess of coating blend is removed. The coated array is air dried for about one hour and dried in a forced air oven at about 180±3° F. for about one hour to remove residual water.

The coated array did not sag during removal from the bath nor during drying and met the optimum requirement for non-flammability. In other words, when a representative coated sample was inserted in a standard Bunsen burner flame for 5 seconds no ignition took place.

Other outstanding characteristics of the coating obtained in this example are set out in Table I below:

TABLE I.—PROPERTIES OF ELECTROPHORETICALLY DEPOSITED MEMORY TERMINAL COATING

| Test | Conditions | Results |
|---|---|---|
| Corrosive environment: | | |
| 1. $SO_2 + Cl_2$ | 0.1% $SO_2$; 5% $Cl_2$ | No visible coating degradation after 500 hrs. exposure.[1] |
| 2. $H_2S$ | 99.4% moist air (95% rel. hum.)<br>0.2% $H_2S$; 99.8% moist air (95+5% rel. hum.) | Do. |
| Flammability | CMH 6-0430-102 (As set out above.) | |
| Porosity | Volt-ohmeter with moist swab | Rated Class A. |
| Water absorption | ASTM D570 | No shorts. |
| Temperature shock (5 cycles) | −40° F.—5 minutes<br>72° F.—5 minutes<br>150° F.—5 minutes | Average percent absorption: +0.30.<br>Shocking of samples did not cause adhesive failure, cracks, or distortions in the coating. |
| Temperature/humidity cycling | 4 hours at 150° F. and 80% rel. hum.<br>4 hours at 72° F. and 50% rel. hum.<br>16 hours at 150° F. and 50% rel. hum. | Results of 50 days of cycling; no physical degradation. |
| Solvent resistance[2]: | | |
| 1. Chlorethene | 15 minutes | Resistant. |
| 2. Toluene | 10 minutes | Do. |
| 3. Cyclohexane | do | Do. |
| 4. Xylene | do | Do. |
| 5. Methyl ethyl ketone | do | Do. |
| 6. M-682 stripper | do | Do. |
| 7. 77-Stripper | do | Do. |

[1] Humiseal 1A27—twice dipped specimens began to discolor and to show corrosion at 40 hours. Humiseal is a trademark of the Columbia Technical Corporation, Woodside, New York, for a polyurethane resin coating material.
[2] All at room temperature: 73° F.

The coating of this example formed a barrier film characterized by the following properties: (a) nonflammable, (b) non-porous, (c) non-cracking, (d) flexible, (e) tight and uniform adhesion to all aspects of the metallic surface irrespective of angularity, (f) a substantial and desired accrual of thickness, (g) high dielectric strength and (h) quick formation thereby meeting the most exacting design requirements.

By using the techniques set out above other blends of saran copolymer/epoxy ester latices were shown to provide greatly improved resistance to hostile environment such as the Daran X–225/epoxy ester blend of latices in proportions of 90/10 to 20/80 and especially in the range of 90/10 to 50/50. In the CX–7150/epoxy ester blend of latices preferred percentages ranged between 80/20 to 20/80. In the CX–2139/epoxy ester blend of latices preferred ranges fell between 60/40 to 30/70. When using a blend of a polyvinylidene fluoride latex containing 20.6% solids with epoxy ester containing about 50% solids, the preferred blend range fell between about 60/40 and 50/50.

While the invention is most advantageously practiced by using blends of readily commercially available latices of (a) polyvinylidene fluoride, (b) polyvinylidene chloride or copolymers of polyvinylidene chloride, it will be recognized that blends of co-dispersions of such resins can be used regardless of how they are obtained.

While the invention has been particularly shown and described with reference to preferred embodiments thereof, it will be understood by those skilled in the art that various changes in form and details may be made therein without departing from the spirit and scope of the invention.

What is claimed is:

1. The process for forming upon a metal surface of an electrical device an insulative coating which is useful to protect said surface against hostile corrosive environments tending by attack upon said surface to impair operation of said device, said coating coincidentially possessing a number of the following properties including:

(a) non-flammability (b) non-porosity (c) non-cracking (d) flexibility (e) tight and uniform adhesion to all of said surface irrespective of angularity (f) a substantial accrual of thickness (g) high dielectrical strength (h) quick formation said process comprising:

containing said surface with a blend of co-dispersed aqueous latices of first and second polymer resins;

said first resin being selected from the group of polyvinylidene resins consisting of (a) vinylidene chloride polymers, (b) vinylidene fluoride polymers and (c) vinylidene chloride copolymers;

said second resin consisting of epoxy ester; and while maintaining said contact passing a DC electric current through said surface until said surface is completely covered with blended barrier film of said resins of a desired thickness.

2. The process of claim 1 in which said insulative coating possesses all of said properties.

3. The process of claim 2 in which said polyvinylidene resin is a saran resin.

4. The process of claim 2 in which said polyvinylidene resin is a copolymer of polyvinylidene chloride.

5. The process of claim 2 in which said polyvinylidene resin is a terpolymer of vinylidene chloride, vinyl chloride and acrylonitrile.

References Cited

UNITED STATES PATENTS 3,476,668 11/1969 Scheiber et al. ........ 204—181

OTHER REFERENCES

Shyne: Organic Finishing, vol. 17, No. 5 (May 1956), pp. 12–14.

Fink et al.: Transactions of the Electrochemical Society, vol. 94 (1948), pp. 309, 312 and 338.

HOWARD S. WILLIAMS, Primary Examiner

PO-1050
(5/69)

UNITED STATES PATENT OFFICE
CERTIFICATE OF CORRECTION

Patent No. 3,660,263 Dated May 2, 1972

Inventor(s) Lucien V. Auletta et al

It is certified that error appears in the above-identified patent and that said Letters Patent are hereby corrected as shown below:

Claim 1, please insert subparagraphs:

-- (b) non-porosity (c) non-cracking --;

line 31, please change "containing" to --contacting--.

Signed and sealed this 26th day of September 1972.

(SEAL)
Attest:

EDWARD M.FLETCHER,JR.
Attesting Officer

ROBERT GOTTSCHALK
Commissioner of Patents